(12) United States Patent
Okazaki (10) Patent No.: US 7,484,532 B2
(45) Date of Patent: Feb. 3, 2009

(54) FLEXIBLE-FILM EXPANDABLE GATE

(75) Inventor: Yasuo Okazaki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 101 days.

(21) Appl. No.: 11/076,014

(22) Filed: Mar. 10, 2005

(65) Prior Publication Data

US 2006/0202137 A1   Sep. 14, 2006

(51) Int. Cl.
*F15D 1/02*   (2006.01)

(52) U.S. Cl. .............................. 138/45; 138/46; 138/93

(58) Field of Classification Search ............... 138/93, 138/45, 46
See application file for complete search history.

(56) References Cited

U.S. PATENT DOCUMENTS

| | | | |
|---|---|---|---|
| 2,706,612 A * | 4/1955 | Ratelband ..................... | 251/5 |
| 2,746,709 A * | 5/1956 | Minor .......................... | 277/324 |
| 2,898,078 A | 8/1959 | Stephenson et al. | |
| 3,060,966 A | 10/1962 | Ratelband | |
| 3,203,662 A | 8/1965 | Lau | |
| 3,479,002 A * | 11/1969 | Hirs ............................. | 251/5 |
| 3,836,113 A * | 9/1974 | Johnson ........................ | 251/5 |
| 3,918,674 A * | 11/1975 | Sutter ........................... | 251/5 |
| 3,946,761 A * | 3/1976 | Thompson et al. ........... | 138/98 |
| 4,023,772 A * | 5/1977 | Ratelband ..................... | 251/5 |
| 4,076,872 A * | 2/1978 | Lewicki et al. ............... | 428/12 |
| 4,111,391 A * | 9/1978 | Pilolla ........................... | 251/5 |
| 4,191,358 A * | 3/1980 | Ferri ............................. | 251/5 |
| 4,195,810 A * | 4/1980 | Lavin ............................ | 251/5 |

FOREIGN PATENT DOCUMENTS

| | | |
|---|---|---|
| GB | 1 032 596 | 6/1966 |
| GB | 2 076 504 A | 12/1981 |
| JP | 2002-88746 A | 3/2002 |

OTHER PUBLICATIONS

Norwegian Search Report, 200512945, Oct. 2005.
European Search Report, EP 05 25 1542; Oct. 2005.

* cited by examiner

*Primary Examiner*—James F Hook
(74) *Attorney, Agent, or Firm*—Sughrue Mion, PLLC (57) ABSTRACT

A sealing rib is disposed within a pipeline, such that an interior of the pipeline is divided uniformly into plural flow paths along a peripheral direction. A flexible-film body to whose interior a fluid for inflation can be supplied, is disposed in each divisional flow path. Each of the plural flexible-film bodies within the pipeline is inflated by the fluid so as to block-up the pipeline. Therefore, a height of the flexible-film body which is in an inflated state can be made to be low. Further, because little tension is applied to the flexible-film body, it suffices for a durable strength required of the flexible-film body to be small. In accordance with this structure, it is possible to obtain a flexible-film expandable gate which does not use a highly-rigid film body, and which can reliably exhibit a water stopping ability even in a pipeline of a large diameter.

23 Claims, 10 Drawing Sheets

FLEXIBLE-FILM EXPANDABLE GATE

BACKGROUND OF THE INVENTION

1. Field of the Invention

The present invention relates to a flexible-film expandable gate, and in particular, to a flexible-film expandable gate which is disposed in a pipeline, and which adjusts the cross-sectional area of the flow path within the pipeline by being inflated (expanded) and collapsed (contracted) due to the supply and discharge of a fluid.

2. Description of the Related Art

There has conventionally been known the technique of placing a flexible-film expandable gate, which is structured by a flexible-film body, within a pipeline of waterworks or the like, and opening and closing the pipeline by inflating and collapsing the flexible-film body by the supply and discharge of a fluid (a gas or a liquid) into and from the flexible-film body.

Figure 10:
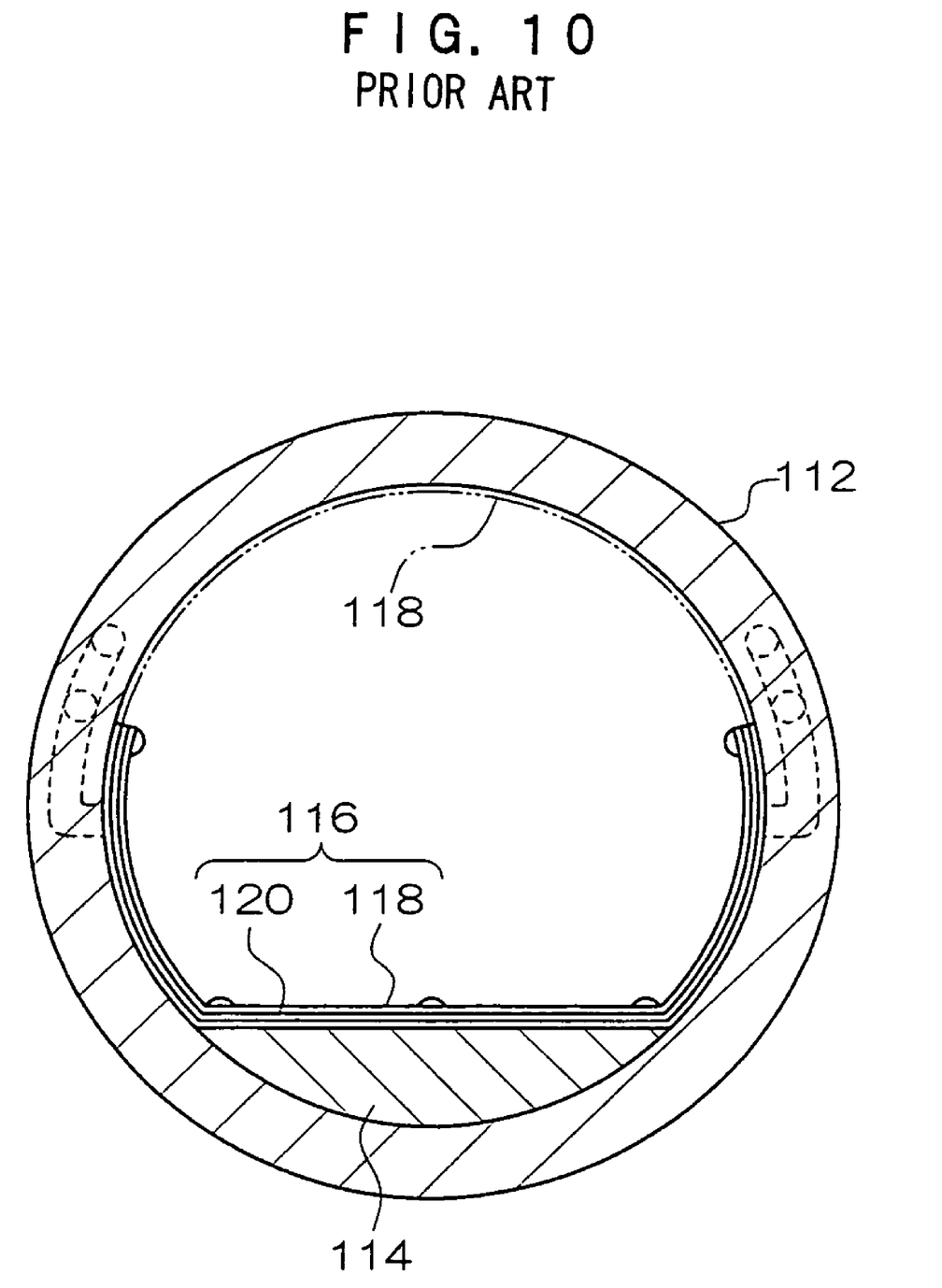
FIG. 10 is a cross-sectional view of a conventional gate for a pipeline.

For example, the gate for a pipeline shown in FIG. 10 (refer to Japanese Patent Application Laid-Open (JP-A) No. 2002-88746) has a pad 114 provided on the floor surface of a pipeline 112, and a film body 116 provided on the pad 114. An upper film 118 and a lower film 120, which structure the film body 116, are mounted by fixing means to the pad 114 in a sealed state. Air is supplied into the space between the upper film 118 and the lower film 120, such that the upper film 118 is inflated.

In a flexible-film expandable gate having such a structure, when, for example, the diameter of the pipeline 112 is large, the radius of curvature of the upper film 118, in the state in which the upper film 118 is inflated and tightly contacts the upper wall surface of the pipeline 112, is large. Further, when damming-up a fluid of a high water level for example, high fluid pressure reaches the upper film 118, and the pressure within the film body 116 increases.

Here, it is generally known that the tension acting on the film body is the product of the internal pressure of the film body and the radius of curvature of the film body when inflated. Therefore, in a case in which the pipeline has a large diameter and a fluid of a high water level is dammed-up, a film body having high strength, i.e., high rigidity, is needed in order to be able to withstand the high tension.

However, when a highly-rigid film body is used in order to improve the durability, the elongation of the film body when inflated is poor. Therefore, it is difficult to completely block-up the pipeline.

SUMMARY OF THE INVENTION

In view of the aforementioned, the present invention is to provide a flexible-film expandable gate which does not use a highly-rigid film body, and which can reliably exhibit a water stopping ability even in a pipeline of a large diameter.

A first aspect of the present invention is a flexible-film expandable gate disposed in a pipeline, and adjusting a cross-sectional area of a flow path within the pipeline by being inflated and collapsed by supply and discharge of a fluid for gate operation, the gate including: a plurality of flexible-film bodies disposed so as to divide an inner periphery of the pipeline into plural sections in a peripheral direction; and a supply/discharge opening for supplying and discharging the fluid which inflates the flexible-film bodies.

In this flexible-film expandable gate, the plural flexible-film bodies are disposed so as to divide the inner periphery of the pipeline into plural sections. By inflating (expanding) the plural, bag-shaped flexible-film bodies, the cross-sectional area of the flow path of the pipeline can be reduced (or the pipeline can be blocked). As compared with a case in which a flexible-film expandable gate is structured by disposing only one flexible-film body within a pipeline, the height of the flexible-film body when the flexible-film body is in an inflated state can be made shorter. Therefore, when the same internal pressure is applied, the applied tension is smaller, and the durable strength required of each of the flexible-film bodies can be small. Namely, a pipeline of a large diameter can be reliably blocked-up even if a highly-rigid film body is not used.

A second aspect of the present invention is a flexible-film expandable gate disposed in a pipeline, and adjusting a cross-sectional area of a flow path within the pipeline by being inflated and collapsed by supply and discharge of a fluid for gate operation, the gate including: a plurality of flexible-film bodies disposed so as to divide an inner periphery of the pipeline into plural sections in a peripheral direction; a supply/discharge opening for supplying and discharging the fluid which inflates the flexible-film bodies; and one or more sealing members fixed within the pipeline, and having contact portions which can completely block-up the pipeline due to the flexible-film bodies, in inflated states, contacting the contact portions.

Due to the flexible-film bodies, which are in inflated states, contacting the contact portions of the sealing member, the pipeline can be reliably blocked.

Radii of curvature of the flexible-film bodies when the flexible-film bodies are inflated, and radii of curvature of the contact portions of the sealing member, may be equal.

In this way, when the flexible-film bodies, which are inflated, contact the contact portions of the sealing member, no gaps arise therebetween, and the pressure applied to the flexible-film bodies from the contact portions can be made to be substantially equal. Therefore, water can be stopped even more reliably.

At least a cross-section of an inner side of the pipeline may be circular, and a radius of curvature of the inner periphery of the pipeline and radii of curvature of the flexible-film bodies when the flexible-film bodies are collapsed, may be equal.

When collapsed, the flexible-film body is accommodated along the inner peripheral surface of the pipeline, without any gap therebetween. Therefore, a large cross-sectional area of the flow path within the pipeline can be ensured, and impeding of the flow can be lessened.

A length, in a longitudinal direction of the pipeline, of the contact portion of the sealing member may be 100 mm or less.

In this way, the surface area of contact of the contact portion with the flexible-film body which is inflated is small. Therefore, the contact pressure is large, and water can be stopped even more reliably.

At least one portion of the contact portions of the sealing member may disposed at a downstream side of peak portions of the flexible-film bodies in inflated states.

When fluid pressure is applied from the upstream side of the flow path in the state in which the flexible-film body is inflated, there are cases in which the flexible-film body is pushed and deforms toward the downstream side. By disposing at least a portion of the contact portion at the downstream side of the peak portion of the flexible-film body which is in the inflated state, the flexible-film body which is deformed toward the downstream side reliably contacts the contact portion. Therefore, water can be stopped even more reliably.

A plurality of the contact portions of the sealing member may be disposed, in a longitudinal direction of the pipeline, for each one flexible-film body.

In this structure, the contact portions are disposed at least at the upstream side and the downstream side. Even if the contact pressure between the flexible-film body and the upstream side contact portion weakens due to the fluid pressure applied from the upstream side to the flexible-film body which is inflated, the water stopping ability can be reliably maintained due to the contact between the flexible-film body and the downstream side contact portion.

Because the present invention has the above-described structure, without using a highly-rigid film, it is possible to reliably exhibit a water stopping ability even in a pipeline of a large diameter.

BRIEF DESCRIPTION OF THE DRAWINGS

Embodiments of the present invention will be described in detail based on the following figures, wherein:

FIGS. 5A and 5B are schematic diagrams showing the heights and lengths of flexible-film bodies, wherein FIG. 5A is the case of the present invention and FIG. 5B is the case of the comparative example shown in FIG. 4;

DETAILED DESCRIPTION OF THE INVENTION

Figure 1:
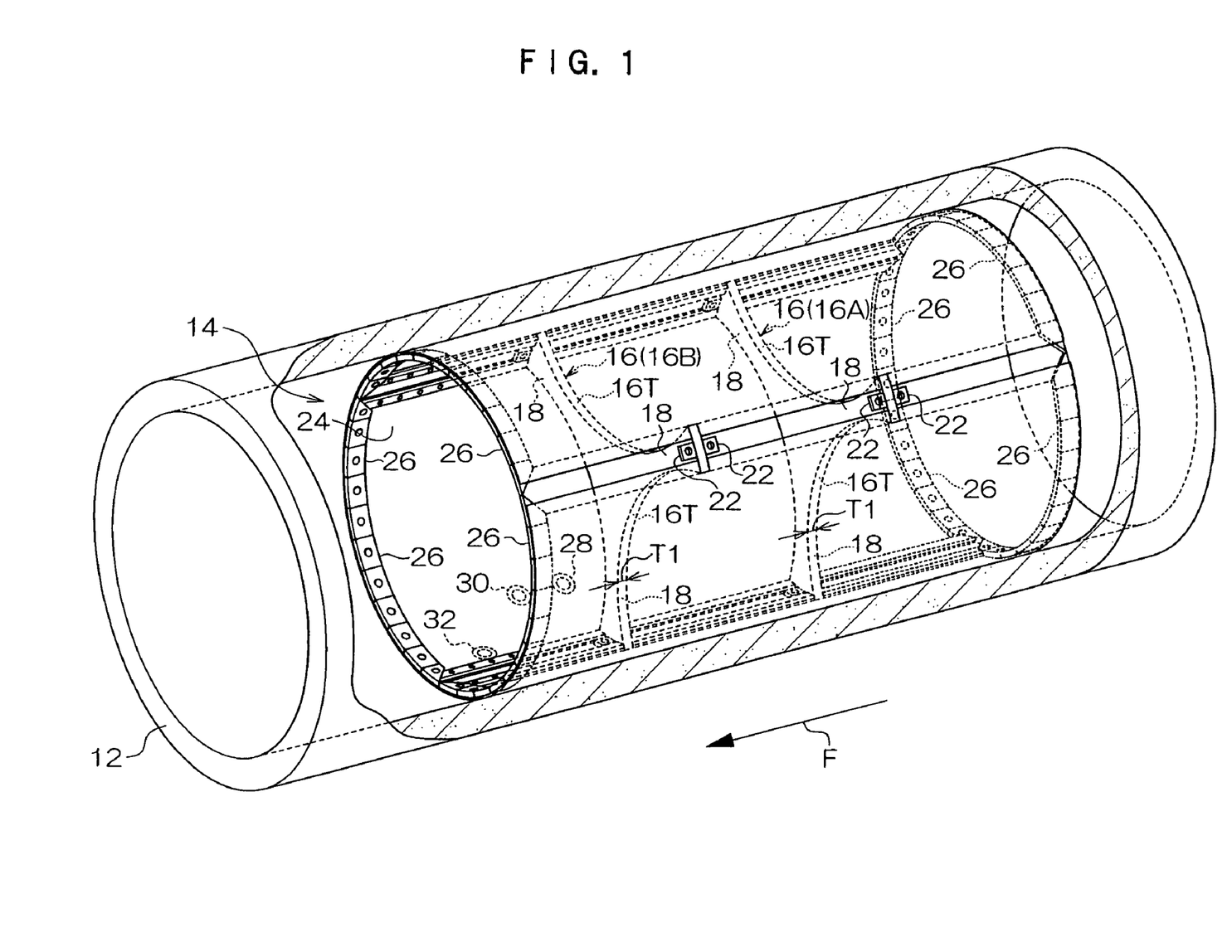
FIG. 1 is a partially cut-away perspective view of a pipeline to which a flexible-film expandable gate of a first embodiment of the present invention is applied.
Figure 2:
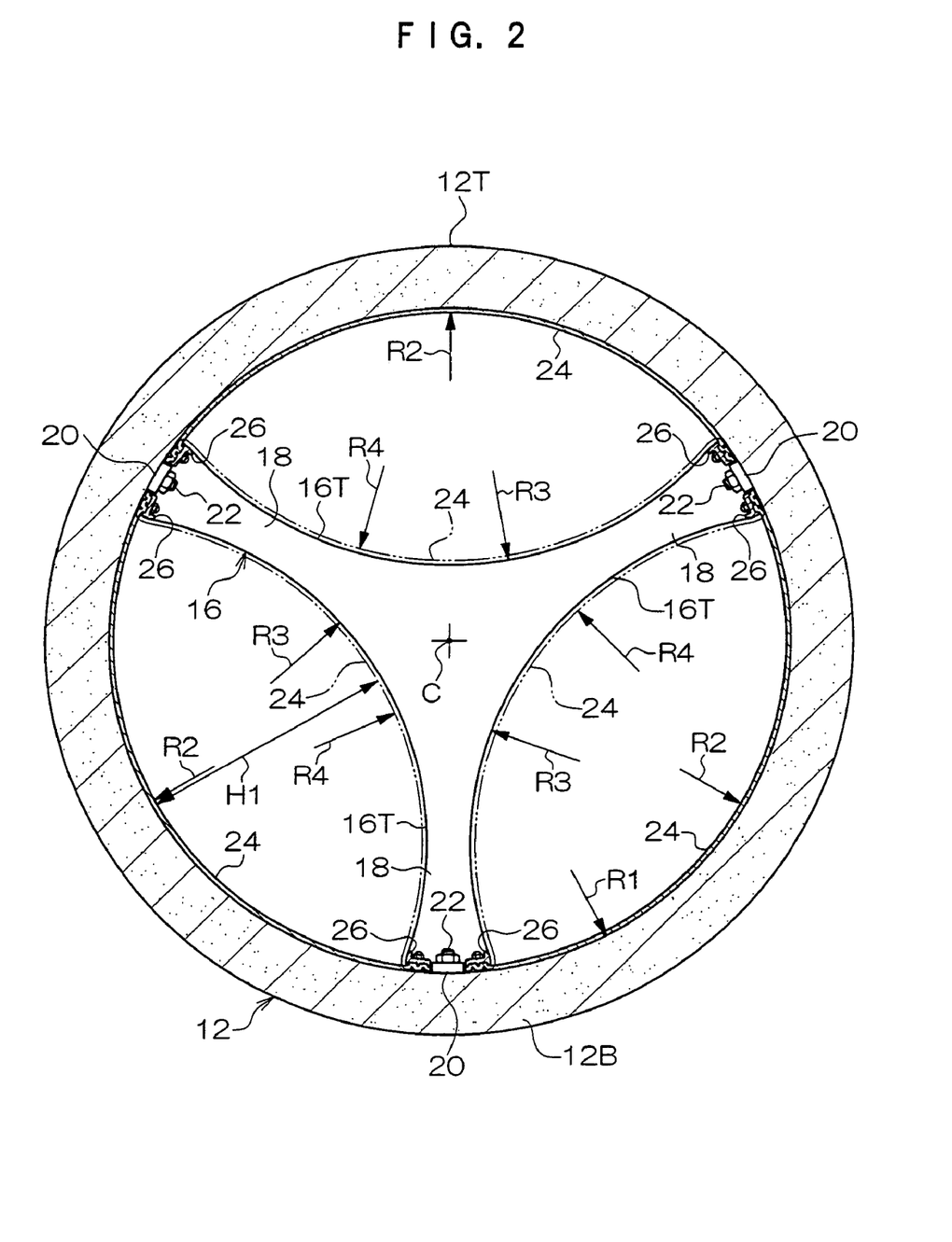
FIG. 2 is a cross-sectional view, in a plane orthogonal to a flowing direction, showing the pipeline to which the flexible-film expandable gate of the first embodiment of the present invention is applied.

A pipeline 12, to which a flexible-film expandable gate 14 of a first embodiment of the present invention is applied, is shown in FIGS. 1 and 2. In the first embodiment, the pipeline 12 is formed in the shape of a cylindrical tube, the interior thereof is a flow path, and fluid flows through the pipeline 12 in the direction of arrow F. Hereinafter, the fluid flowing within the pipeline 12 will be called the "in-pipeline fluid", and "flowing direction" will mean the direction in which the in-pipeline fluid flows within the pipeline 12. The flowing direction coincides with the longitudinal direction of the pipeline 12.

Figure 3:
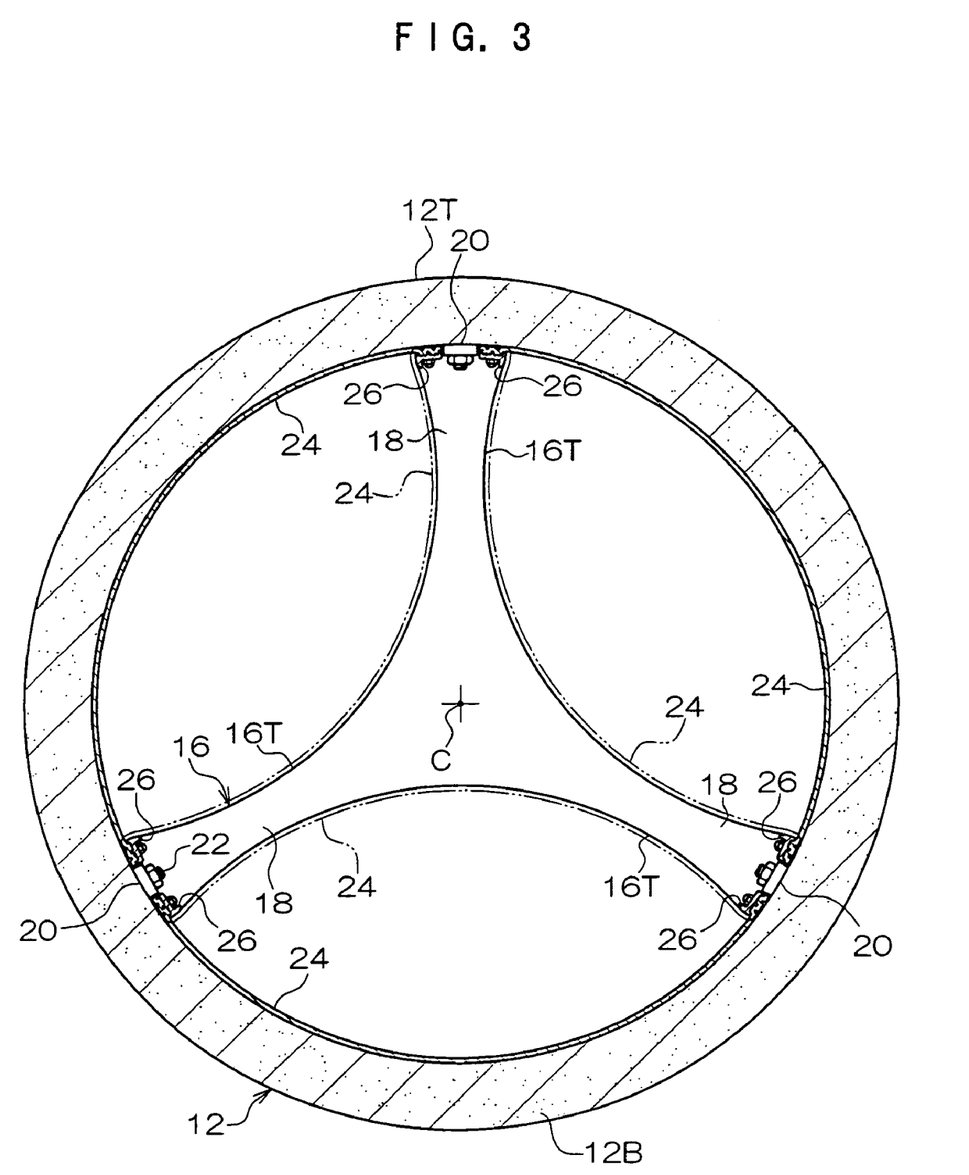
FIG. 3 is a cross-sectional view showing the same flexible-film expandable gate as that of FIG. 2, but here showing a case in which one flow path in the pipeline is positioned on a floor portion of the pipeline.

Sealing ribs 16 are disposed in the pipeline 12 at the upstream and downstream sides in the flowing direction. As shown in FIG. 2, the sealing rib 16 has leg portions 18 which extend out uniformly in three directions from a center C. A fixing implement 20 is welded on the distal end of the leg portion 18. The sealing rib 16 is fixed to the inner peripheral surface of the pipeline 12 due to anchor bolts 22, which extend out from the pipeline 12, being fastened to the fixing implements 20 by nuts. In this way, the interior of the pipeline 12 is divided equally into three flow paths along the peripheral direction. Note that, in FIGS. 1 and 2, one of the leg portions 18 is fixed in a vicinity of a floor portion 12B of the pipeline 12. However, as shown in FIG. 3, one flow path may be positioned in a vicinity of the floor portion 12B of the pipeline 12. (In this case, one of the leg portions 18 is fixed in a vicinity of a peak portion 12T of the pipeline 12). When a single divisional flow path is structured in a vicinity of the floor portion 12B of the pipeline 12 in this way, workers can pass through this divisional flow path at the time of inspecting the flexible-film expandable gate 14, or the like.

As shown in FIG. 2, a flexible-film body 24 is disposed at each of the divisional flow paths divided by the sealing rib 16. Each of the flexible-film bodies 24 is fastened by bolts at mounting fixtures 26 to the pipeline 12 over the entire periphery, and is sealed.

As shown in FIG. 1, a supply/discharge opening 28 for supplying and discharging fluid for inflation (for gate operation) to the respective flexible-film bodies 24, an internal pressure sensing opening 30 for sensing the inflated states of the flexible-film bodies 24 by their internal pressures, and a drain opening 32 for discharging drainage, are formed in the pipeline 12. Fluid for inflation (a gas or a liquid) is supplied into the flexible-film bodies 24 from the supply/discharge opening 28 so as to inflate the flexible-film bodies 24. Similarly, the flexible-film bodies 24 can be collapsed by discharging the fluid for inflation. In FIG. 2, the flexible-film bodies 24 in their collapsed states are shown by the solid lines, and the flexible-film bodies 24 in their inflated states are shown by the two-dot chain lines. The inflated state of the flexible-film body 24 can be known by sensing the internal pressure within the flexible-film body 24 from the internal pressure sensing opening 30.

Respective one ends of communicating pipes (not shown), which are within grooves formed in advance at the inner peripheral surface side of the pipeline 12, are connected to the supply/discharge opening 28, the internal pressure sensing opening 30, and the drain opening 32. The other ends of these communicating pipes are connected to a control board (not illustrated) which is disposed at the exterior of the pipeline 12. The flexible-film expandable gate 14 can be controlled and monitored via this control board.

A radius of curvature R1 of the inner peripheral surface of the pipeline 12, and a radius of curvature R2 of the flexible-film body 24 in the collapsed state, are equal. Accordingly, the flexible-film body 24 in the collapsed state does not protrude out toward the inner side of the pipeline 12, and a wide cross-sectional area of the flow path can be ensured.

At the sealing rib 16, the portions between the respective leg portions 18 are curved in arc-shapes and form contact portions 16T. A radius of curvature R3 of the contact portion 16T is equal to a radius of curvature R4 of the flexible-film body 24 in the inflated state. When the flexible-film body 24 is inflated, it can contact the contact portion 16T without any gap therebetween.

As can be understood from FIG. 1, a thickness T1 (the width in the flowing direction) of each of the sealing ribs 16 is 100 mm or less. Accordingly, as compared with a structure in which this thickness T1 is thicker than that, the surface area of contact between the contact portion 16T and the inflated flexible-film body 24 is smaller, and therefore, the contact pressure is greater.

As shown in FIG. 1, at least the downstream side sealing rib 16B is disposed so as to be further downstream than the peak portion (the most inflated portion) of the flexible-film body 24 when it is in an inflated state and when pressure from the in-pipeline fluid is not being applied thereto. In its inflated state, the flexible-film body 24 deforms by receiving pressure from the in-pipeline fluid within the pipeline 12, and it is supposed that the peak portion is displaced toward the downstream side. However, in this case as well, the flexible-film body 24 reliably contacts the contact portion 16T of the sealing rib 16B. Note that the upstream side sealing rib 16A is disposed at a position which is at the substantial center in the longitudinal direction of the flexible-film bodies 24.

In the first embodiment which is structured in this way, when there is no need to block the pipeline 12 or to reduce the cross-sectional area of the flow path, the flexible-film bodies 24 are collapsed by the fluid for inflation not being supplied to the flexible-film bodies 24 (or by the fluid for inflation being actively removed). The radius of curvature R1 of the inner peripheral surface of the pipeline 12 and the radius of curvature R2 of the flexible-film body 24 when collapsed are equal, and a wide effective cross-sectional area of the flow path can be ensured. Therefore, the in-pipeline fluid flows smoothly within the pipeline 12.

When the pipeline 12 is to be blocked, a signal to supply the fluid for inflation is sent to the respective three flexible-film bodies 24 from the unillustrated control board, and the fluid for inflation is supplied into the flexible-film bodies 24 through the communicating pipe. Due to the fluid for inflation, the flexible-film bodies 24 inflate, and press-contact the sealing ribs 16A, 16B. In this way, the pipeline 12 is completely blocked, and the flow of the in-pipeline fluid can be stopped.

In the state in which the flexible-film bodies 24 are inflated, the internal pressure of the flexible-film bodies 24 passes from the internal pressure sensing opening 30 through the communicating pipe, and can be known at the control board. Therefore, when the interiors of the flexible-film bodies 24 reach a predetermined internal pressure, the supply of the fluid for inflation is stopped. In particular, when there is no need to completely block-up the pipeline 12 and it suffices to merely reduce the cross-sectional areas of the flow paths, it suffices to stop the supply of the fluid for inflation when the internal pressures reach a predetermined value in a stage before the flexible-film bodies 24 contact the contact portions 16T.

Figure 4:
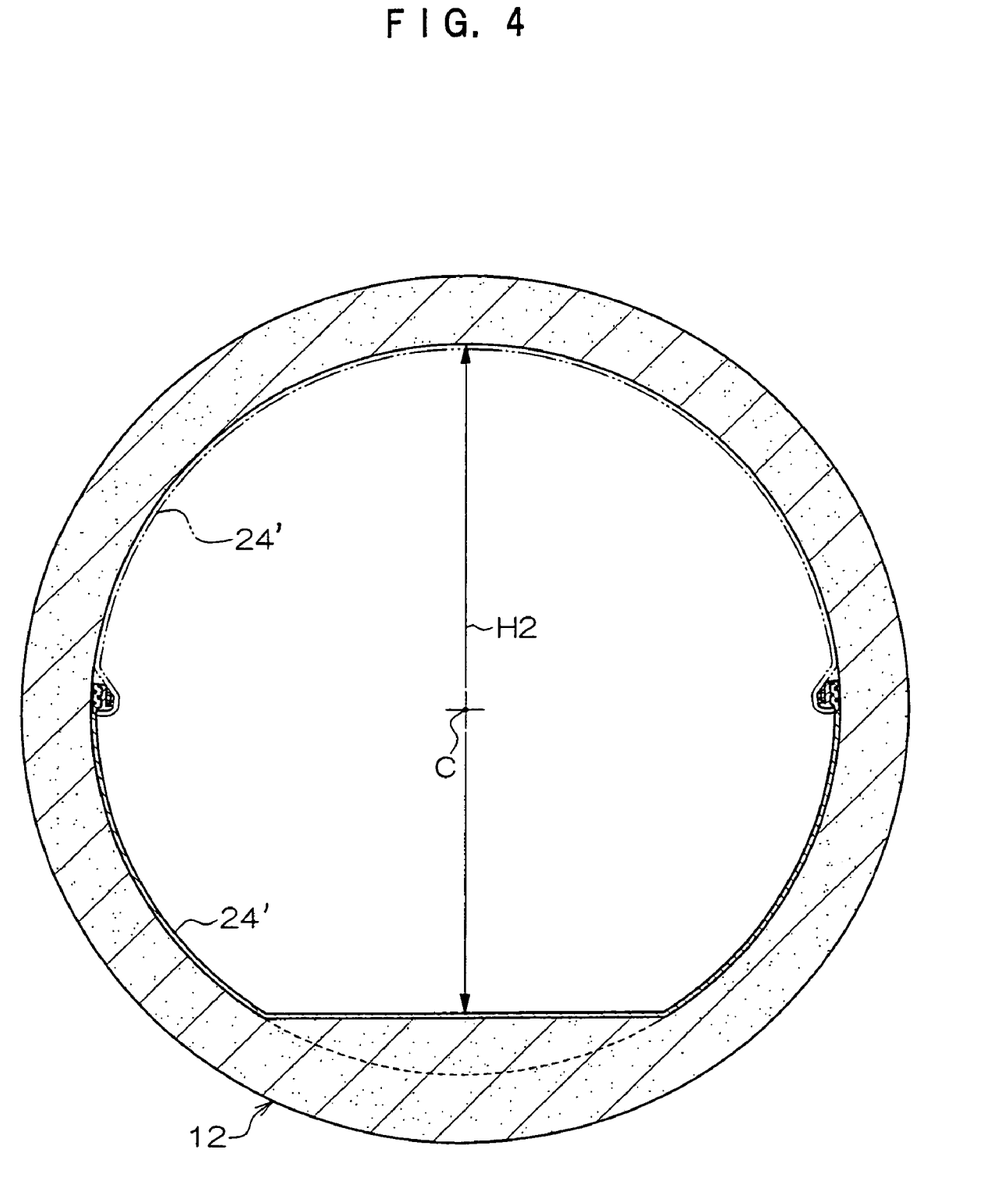
FIG. 4 is a cross-sectional view, in a plane orthogonal to the flowing direction, showing a pipeline in which only one flexible-film body is disposed, for comparison with the present invention.
Figure 5A:
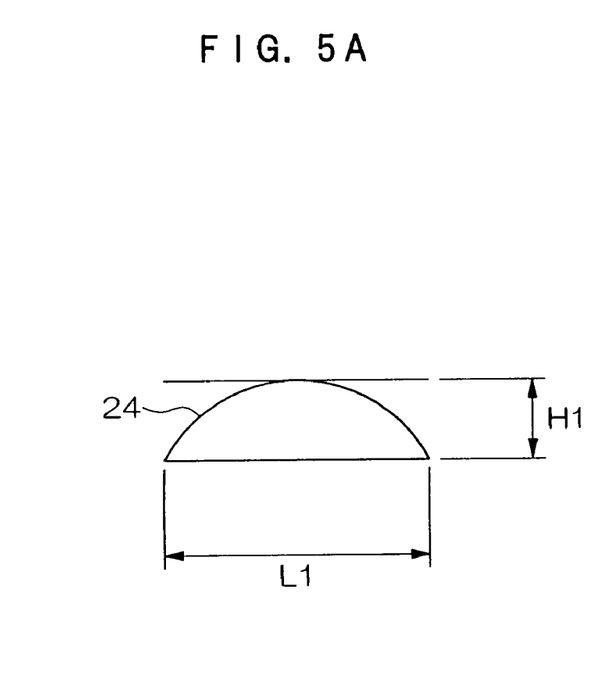

As can be understood from FIGS. 2 and 3 as well, in the present embodiment, because the pipeline 12 is blocked by inflating the respective three flexible-film bodies 24, which are provided separably along the peripheral direction within the pipeline 12, an inflated height HI of the flexible-film body 24 can be made to be low (see FIG. 5A). In contrast, as in the case of the comparative example shown in FIG. 4, in a structure in which only one flexible-film body 24' is provided within the pipeline 12, in order to completely block-up the pipeline 12, an inflated height H2 of the flexible-film body 24' must substantially be made to be about the same as the diameter of the pipeline 12 (see FIG. 5B). In the present embodiment, in the case of the same internal pressure as the comparative example shown in FIG. 4, the tension applied to the flexible-film body 24 can be reduced, and therefore, the durable strength required of the flexible-film body 24 also can be set to be low. Namely, the pipeline 12 can be blocked without using a highly-rigid structure as the flexible-film body 24. Further, because the flexible-film body 24 which has low rigidity elongates easily, the flexibility in the vicinities of the mounting fixtures 26 (in particular, the mounting fixtures 26 at the transverse direction end portions) can be maintained good, and it is possible to prevent an inadvertent gap from arising between the flexible-film body 24 and the inner surface of the pipeline 12.

Figure 5B:
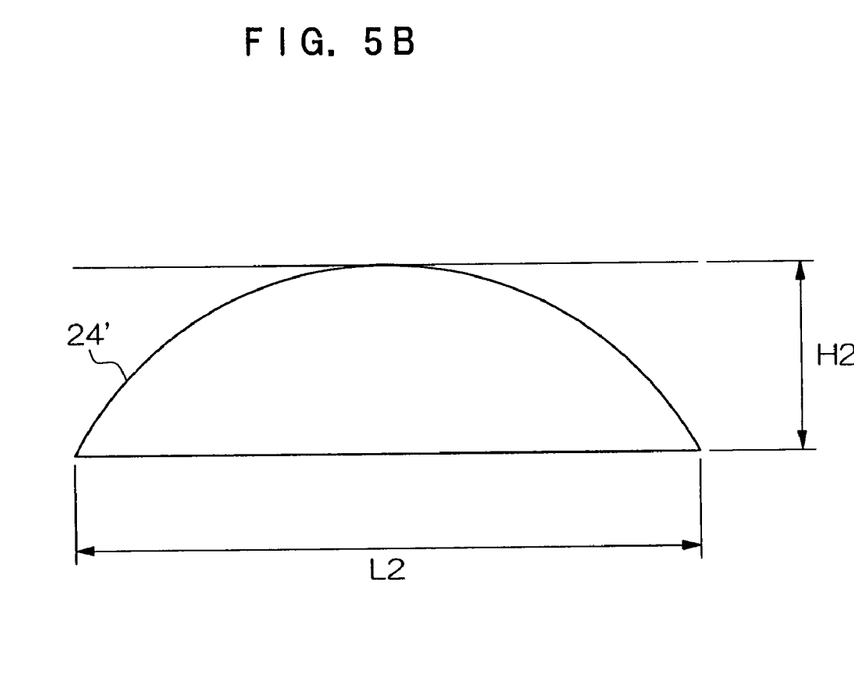

As can be understood by comparing FIG. 5A and FIG. 5B, a length L1 of the flexible-film body 24 of the present embodiment is shorter than a length L2 of the flexible-film body 24' of the comparative example.

Further, the pressure of the fluid for inflation is borne in common by the three flexible-film bodies 24. Therefore, the pressure applied to each flexible-film body 24 can be made to be small, and the durability of the flexible-film body 24 can be improved.

Moreover, because the volume of the flexible-film body 24 when inflated also is small, the flexible-film body 24 can be inflated and collapsed in a short period of time. For example, even if the state of the in-pipeline fluid suddenly changes, the flexible-film body 24 can be inflated or collapsed so as to handle the situation in a short time.

In the inflated state of the flexible-film body 24, the radius of curvature R4 thereof and the radius of curvature R3 of the contact portion 16T are equal. Therefore, the contact pressure of the flexible-film body 24 with respect to the contact portion 16T is uniform, and the pipeline 12 can be reliably blocked.

The thickness T1 of the sealing rib 16 is 100 mm or less (preferably 30 to 50 mm). As compared with a structure in which the thickness T1 is greater than 100 mm, the contact surface area of the flexible-film body 24 is smaller, and therefore, a larger contact pressure can be obtained, and the pipeline 12 can be reliably blocked.

In the state in which the flexible-film bodies 24 are inflated and the pipeline 12 is blocked, when the pressure of the in-pipeline fluid is applied to the flexible-film bodies 24, the flexible-film bodies 24 deform toward the downstream side, and there are cases in which the peak portions thereof move toward the downstream side. In the present embodiment, the downstream side sealing rib 16B is disposed at the downstream side of the peak portions of the flexible-film bodies 24 before deformation by the in-pipeline fluid. Therefore, even if the peak portions move toward the downstream side as described above, the blocked state of the pipeline 12 can be maintained reliably.

Figure 6:
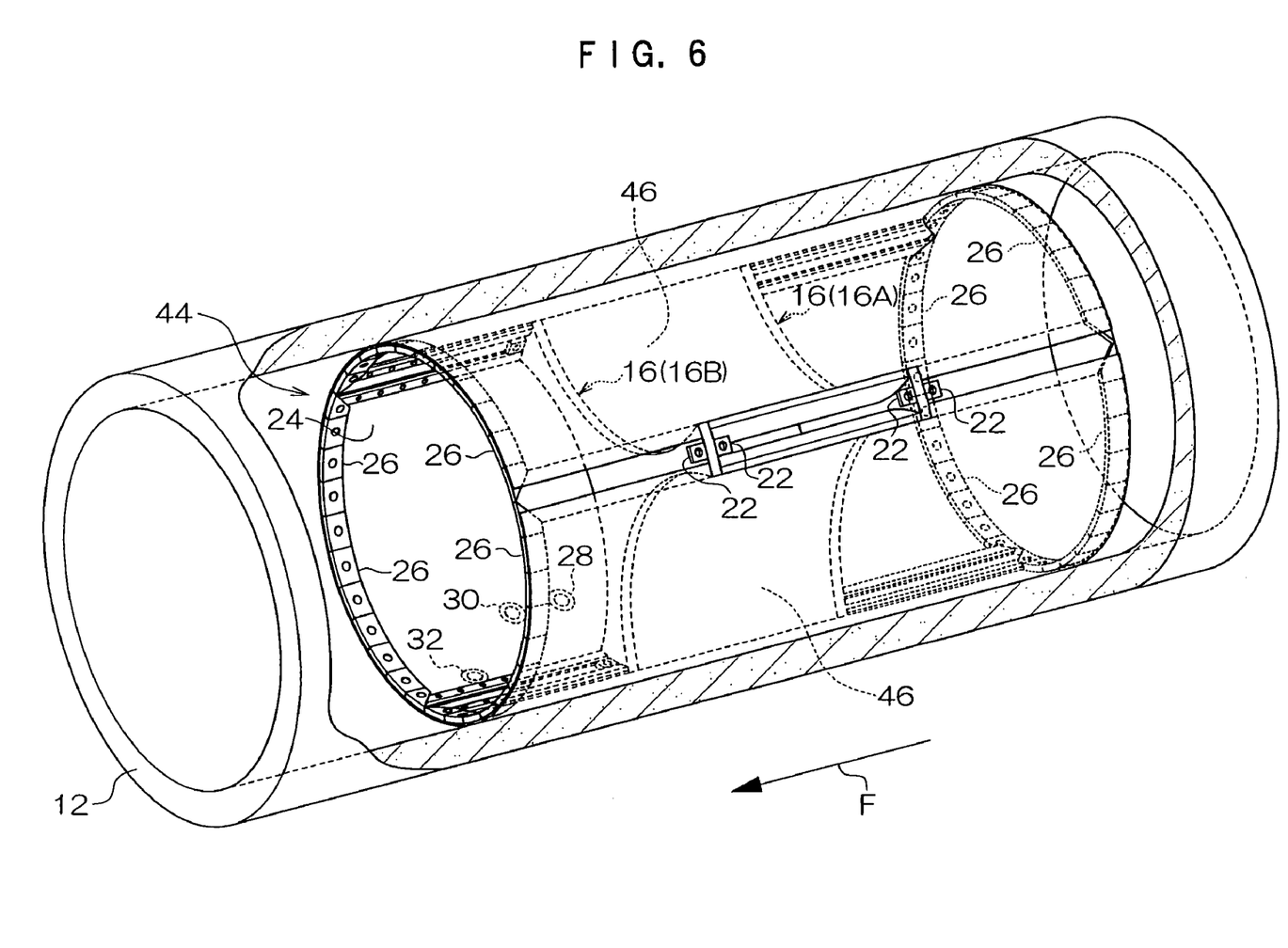
FIG. 6 is a partially cut-away perspective view of a pipeline to which a flexible-film expandable gate of a second embodiment of the present invention is applied.

A flexible-film expandable gate 44 of a second embodiment of the present invention is shown in FIG. 6. In the respective embodiments hereinafter, structural elements which are the same as those of the first embodiment are denoted by the same reference numerals, and detailed description thereof is omitted.

The flexible-film expandable gate 44 of the second embodiment has substantially the same structure as the flexible-film expandable gate 14 of the first embodiment, but differs in that three interior wall bodies 46, which correspond to the three contact portions 16T respectively, are disposed between the upstream side sealing rib 16A and the downstream side sealing rib 16B. Each of the interior wall bodies 46 is formed so as to have a similar radius of curvature as the contact portion 16T, and is welded to the sealing ribs 16A, 16B. The interval between the sealing ribs 16A, 16B can be maintained constant by these interior wall bodies 46. Further, the region which the flexible-film body 24, which is substantially in an inflated state, can contact is not only the contact portions 16T, but also extends to the interior wall body 46 as well. Therefore, even if the inflated flexible-film body 24 deforms toward the downstream side due to the pressure from the in-pipeline fluid, the flexible-film body 24 contacts the contact portion 16T or the interior wall body 46, and can reliably block-up the pipeline 12.

Figure 7:
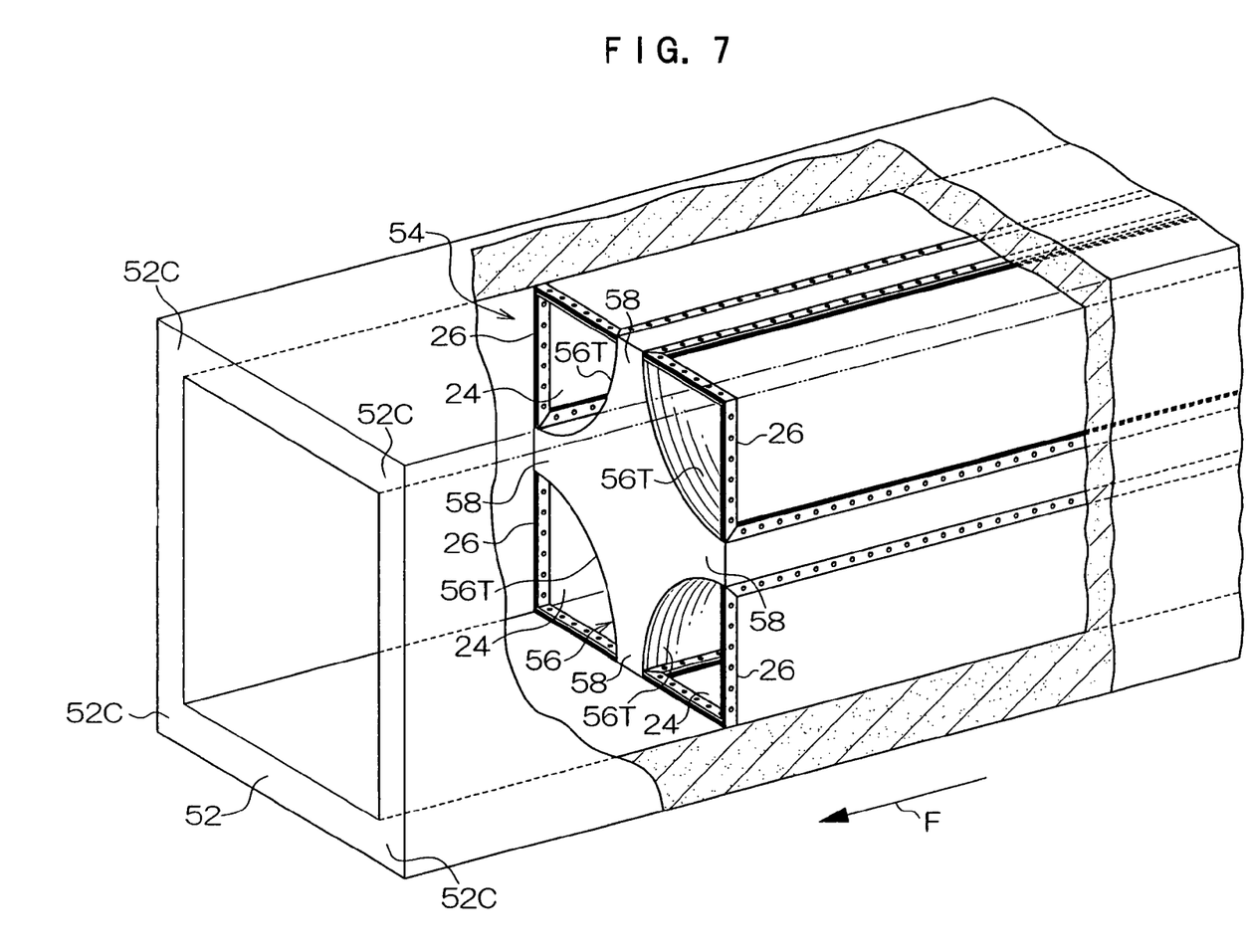
FIG. 7 is a partially cut-away perspective view of a pipeline to which a flexible-film expandable gate of a third embodiment of the present invention is applied.
Figure 8:
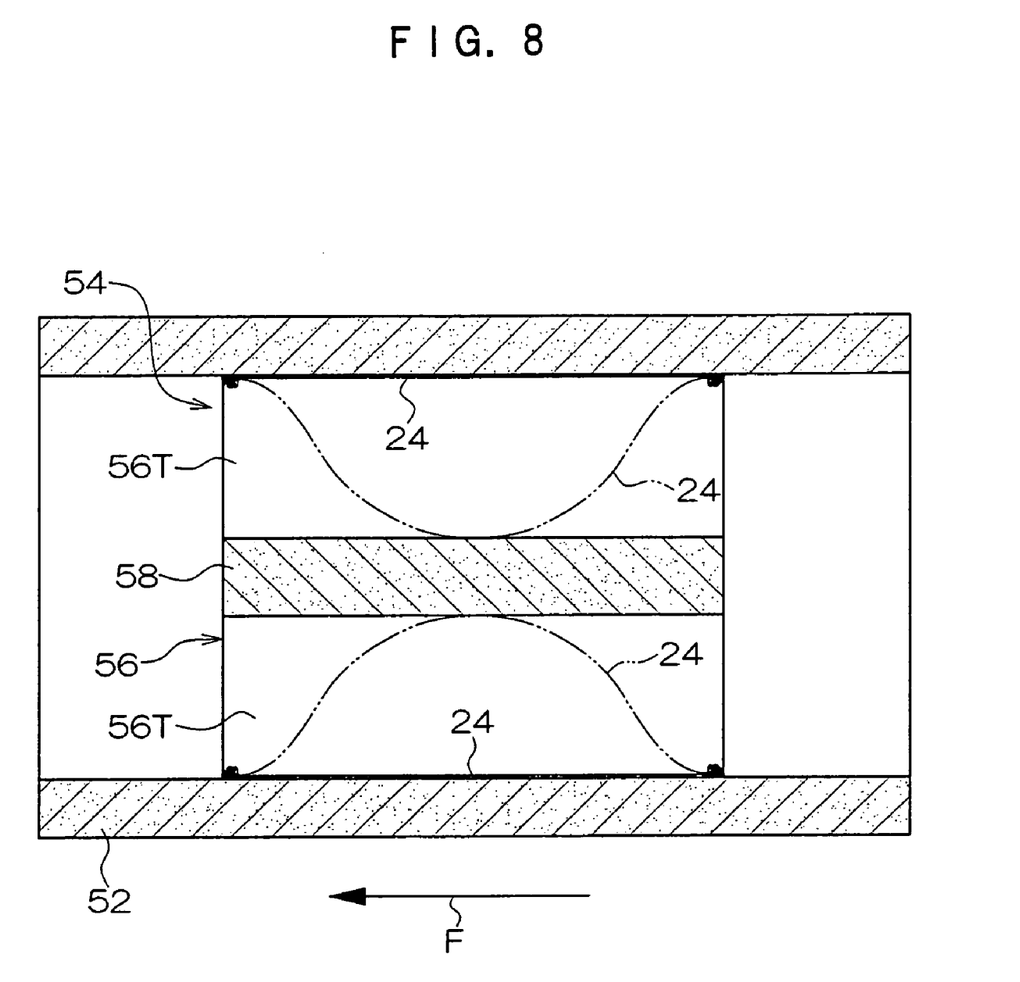
FIG. 8 is a cross-sectional view of the pipeline to which the flexible-film expandable gate of the third embodiment is applied.

A pipeline 52, to which a flexible-film expandable gate 54 of a third embodiment of the present invention is applied, is shown in FIGS. 7 and 8.

In the third embodiment, the pipeline 52 is formed so as to have a square cross-section. A sealing wall body 56, which is made of concrete for example, is disposed within the pipeline 52. The sealing wall body 56 has leg portions 58 extending in four directions from the center, as seen along the flowing direction. The distal ends of the leg portions 58 are formed integrally with the pipeline 52 at the centers of the four walls of the pipeline 52.

The flexible-film bodies 24 are disposed such that respective corner portions 52C of the pipeline 52 coincide with the centers in the expanding directions of the flexible-film bodies 24. The surfaces of the sealing wall body 56 between the respective leg portions 58 are contact portions 56T. When the fluid for inflation is supplied to the flexible-film body 24 and the flexible-film body 24 inflates, the flexible-film body 24 contacts the contact portion 56T. As can be understood from FIG. 8, in the present embodiment, the sealing wall body 56 and the flexible-film bodies 24 have the same widths in the flowing direction.

In the third embodiment which is structured in this way, the portions which the flexible-film bodies 24 in their inflated states contact (i.e., the contact portions 56T) are ensured to be sufficiently longer in the flowing direction than in the first embodiment. Therefore, even if the inflated flexible-film body 24 deforms toward the downstream side due to the pressure from the in-pipeline fluid, the flexible-film body 24 reliably maintains the state of contacting the contact portion 56T, and can reliably block-up the pipeline 12.

Further, in the third embodiment, the flexible-film bodies 24 are disposed so as to correspond to the corner portions 52C of the pipeline 52 whose cross-section is square. Therefore, there is no need to provide the flexible-film body 24 with elongation which is more than that needed at the time when the flexible-film body 24 is inflated, and a sufficient length of the flexible-film body 24 in the radial direction (the direction orthogonal to the flowing direction) can be provided.

Figure 9:
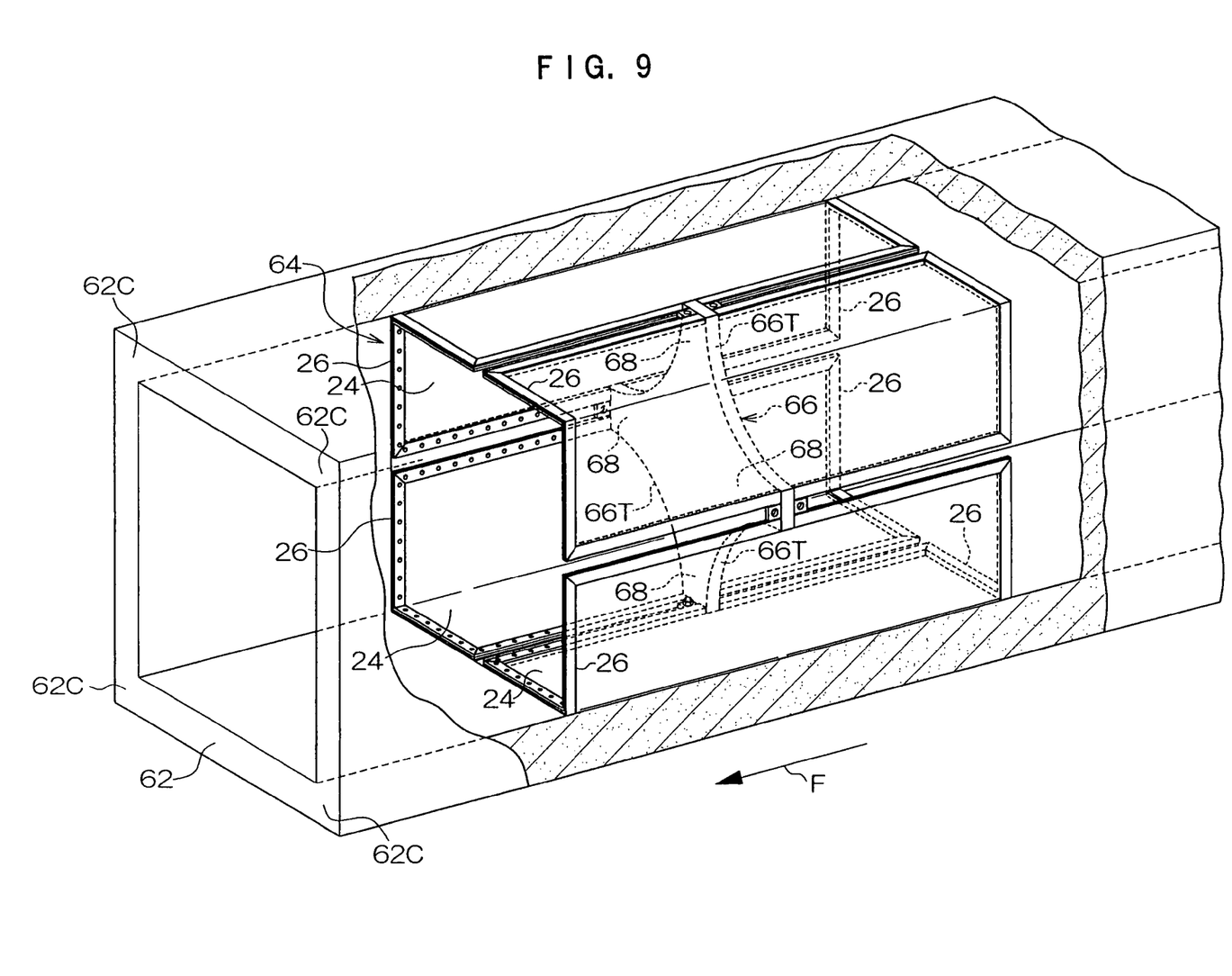
FIG. 9 is a partially cut-away perspective view of the pipeline to which the flexible-film expandable gate of the fourth embodiment is applied.

A pipeline 62, to which is applied a flexible-film inflatable gate 64 of a fourth embodiment of the present invention, is shown in FIG. 9. In the fourth embodiment as well, in the same way as in the third embodiment, the pipeline 62 has a square cross-section.

In the same way as in the first embodiment, the fourth embodiment utilizes a sealing rib 66 whose thickness is 100 mm or less (preferably from 30 to 50 mm). Four leg portions 68 of the sealing rib 66 are fixed to the pipeline 62 by the fixing implements 20 and nuts which are similar to those of the first embodiment.

Only one of the sealing ribs 66 is provided within the pipeline 62 in the fourth embodiment, but the number of the sealing ribs 66 is not particularly limited. For example, in the fourth embodiment, two of the sealing ribs 66 may be provided in the flowing direction in the same way as in the first embodiment. In the third embodiment, the sealing wall body 56 is sufficiently long in the flowing direction, and even if the peak portion of the film in an inflated state is deformed toward the downstream side, the state of contact with the contact portion 56T can be maintained. Therefore, it suffices to use the one sealing wall body 56, but the sealing wall body 56 of the third embodiment may be divided into plural sealing wall bodies 56 in the flowing direction. If only one sealing member is provided, in consideration of cases in which the peak portion of the inflated flexible-film body 24 moves toward the downstream side due to the pressure from the in-pipeline fluid, it is preferable to dispose the sealing member further downstream than the center, in the flowing direction, of the flexible-film bodies 24.

As described above, in all of the embodiments of the present invention, because the pipeline is blocked by inflating the respective, plural flexible-film bodies 24, the inflated heights of the flexible-film bodies 24 can be made to be low. Because little tension acts on the flexible-film body 24, the durable strength required of the flexible-film body 24 can also be set to be small. Further, when the flexible-film bodies 24 are collapsed, the flexible-film bodies 24 are disposed along the inner surface of the pipeline, and wide effective surface areas of the flow paths can be ensured. Therefore, the in-pipeline fluid can flow smoothly within the pipeline 12.

Each of the above embodiments describes, as an example, a structure in which the interior of the pipeline is divided into three or four regions, and the flexible-film body 24 is disposed in each of the divisional regions. However, the present invention is not limited to the same, and the number of divisions may be two, or may be five or more.

Moreover, in cases in which the required level of water stopping ability within the pipeline is relatively low, the sealing member can be omitted. Namely, even in a structure in which there is no sealing member, it suffices to sufficiently increase the internal pressure within the plural flexible-film bodies 24 to the extent that the flexible-film bodies 24 directly contact one another. Of course, when an even better water stopping ability is desired, it is preferable that the structure includes the sealing member as in each of the above-described embodiments. Further, the sealing member may be omitted in a pipeline in which there is no need to completely stop the water within the pipeline and it suffices to merely decrease the cross-sectional areas of the flow paths.

What is claimed is:

1. A flexible-film expandable gate disposed in a pipeline, and adjusting a cross-sectional area of a flow path within the pipeline by being inflated and collapsed by supply and discharge of a fluid for gate operation, the gate comprising:

a plurality of flexible-film bodies disposed so as to divide an inner periphery of the pipeline into plural sections in a peripheral direction;

a supply/discharge opening for supplying and discharging the fluid which inflates the flexible-film bodies; and a sealing member fixed within the pipeline, the sealing member having contact portions which can completely block-up the pipeline due to the flexible-film bodies, in inflated states, contacting the contact portions, wherein each of the contact portions comprises an arc shape corresponding to the curvature of the flexible-film bodies when the flexible-film bodies are inflated, wherein the arc shape of each of the contact portions extends linearly in a longitudinal direction of the pipeline.

2. The flexible-film expandable gate of claim 1, wherein the plurality of flexible-film bodies are disposed so as to divide the inner periphery of the pipeline uniformly in the peripheral direction.

3. The flexible-film expandable gate of claim 1, wherein radii of curvature of the flexible-film bodies when the flexible-film bodies are inflated, and radii of curvature of the contact portions of the sealing member, are equal.

4. The flexible-film expandable gate of claim 1, wherein at least a cross-section of an inner side of the pipeline is circular, and a radius of curvature of the inner periphery of the pipeline and radii of curvature of the flexible-film bodies when the flexible-film bodies are collapsed, are equal.

5. The flexible-film expandable gate of claim 1, wherein a length, in a longitudinal direction of the pipeline, of the contact portion of the sealing member is within a range of 30 to 50 mm.

6. The flexible-film expandable gate of claim 1, wherein at least one portion of the contact portions of the sealing member is disposed at a downstream side, of the flow path within the pipeline, of peak portions of the flexible-film bodies in inflated states.

7. The flexible-film expandable gate of claim 1, wherein a plurality of the contact portions of the sealing member are disposed, in a longitudinal direction of the pipeline, for each one flexible-film body.

8. The flexible-film expandable gate of claim 1, wherein a length, in a longitudinal direction of the pipeline, of the contact portion of the sealing member is equal to a length, in the longitudinal direction of the pipeline, of the flexible-film body.

9. The flexible-film expandable gate according to claim 1, wherein the sealing member is formed by concrete.

10. The flexible-film expandable gate according to claim 1, wherein the sealing member is formed by metal.

11. The flexible-film expandable gate of claim 1, wherein a length, in a longitudinal direction of the pipeline, of the contact portion of the sealing member is 100 mm or less.

12. The flexible-film expandable gate of claim 1, wherein the arc shape of the contact portion substantially corresponds to the peak curvature of the film body when the film body is fully inflated.

13. A flexible-film expandable gate disposed in a pipeline, and adjusting a cross-sectional area of a flow path within the pipeline by being inflated and collapsed by supply and discharge of a fluid for gate operation, the gate comprising:

a plurality of flexible-film bodies disposed so as to divide an inner periphery of the pipeline into plural sections in a peripheral direction;

a supply/discharge opening for supplying and discharging the fluid which inflates the flexible-film bodies; and one or more sealing members fixed within the pipeline, and having contact portions which can completely block-up the pipeline due to the flexible-film bodies, in inflated states, contacting the contact portions, wherein each of the contact portions comprises an arc shape corresponding to the curvature of the flexible-film bodies when the flexible-film bodies are inflated;

wherein the arc shape of each of the contact portions extends linearly a longitudinal direction of the pipeline.

14. The flexible-film expandable gate of claim 13, wherein the plurality of flexible-film bodies are disposed so as to divide the inner periphery of the pipeline uniformly in the peripheral direction, and the flow path within the pipeline is divided and demarcated uniformly by the plurality of flexible-film bodies and the one or more sealing members.

15. The flexible-film expandable gate of claim 13, wherein radii of curvature of the flexible-film bodies when the flexible-film bodies are inflated, and radii of curvature of the contact portions of the sealing member, are equal.

16. The flexible-film expandable gate of claim 13, wherein at least a cross-section of an inner side of the pipeline is circular, and a radius of curvature of the inner periphery of the pipeline and radii of curvature of the flexible-film bodies when the flexible-film bodies are collapsed, are equal.

17. The flexible-film expandable gate of claim 13, wherein a length, in a longitudinal direction of the pipeline, of the contact portion of the sealing member is within a range of 30 to 50 mm.

18. The flexible-film expandable gate of claim 13, wherein at least one sealing member among the one or more sealing members is disposed at a downstream side, of the flow path within the pipeline, of peak portions of the flexible-film bodies in inflated states.

19. The flexible-film expandable gate of claim 13, wherein a length, in a longitudinal direction of the pipeline, of the contact portion of the sealing member is equal to a length, in the longitudinal direction of the pipeline, of the flexible-film body.

20. The flexible-film expandable gate according to claim 13, wherein the sealing member is formed by concrete.

21. The flexible-film expandable gate according to claim 13, wherein the sealing member is formed by metal.

22. The flexible-film expandable gate of claim 13, wherein a length, in a longitudinal direction of the pipeline, of the contact portion of the sealing member is 100 mm or less.

23. The flexible-film expandable gate of claim 13, wherein the arc shape of the contact portion substantially corresponds to the peak curvature of the film body when the film body is fully inflated.

* * * * *